Feb. 18, 1936.  A. J. EULBERG  2,031,151
VALVE
Filed March 15, 1935
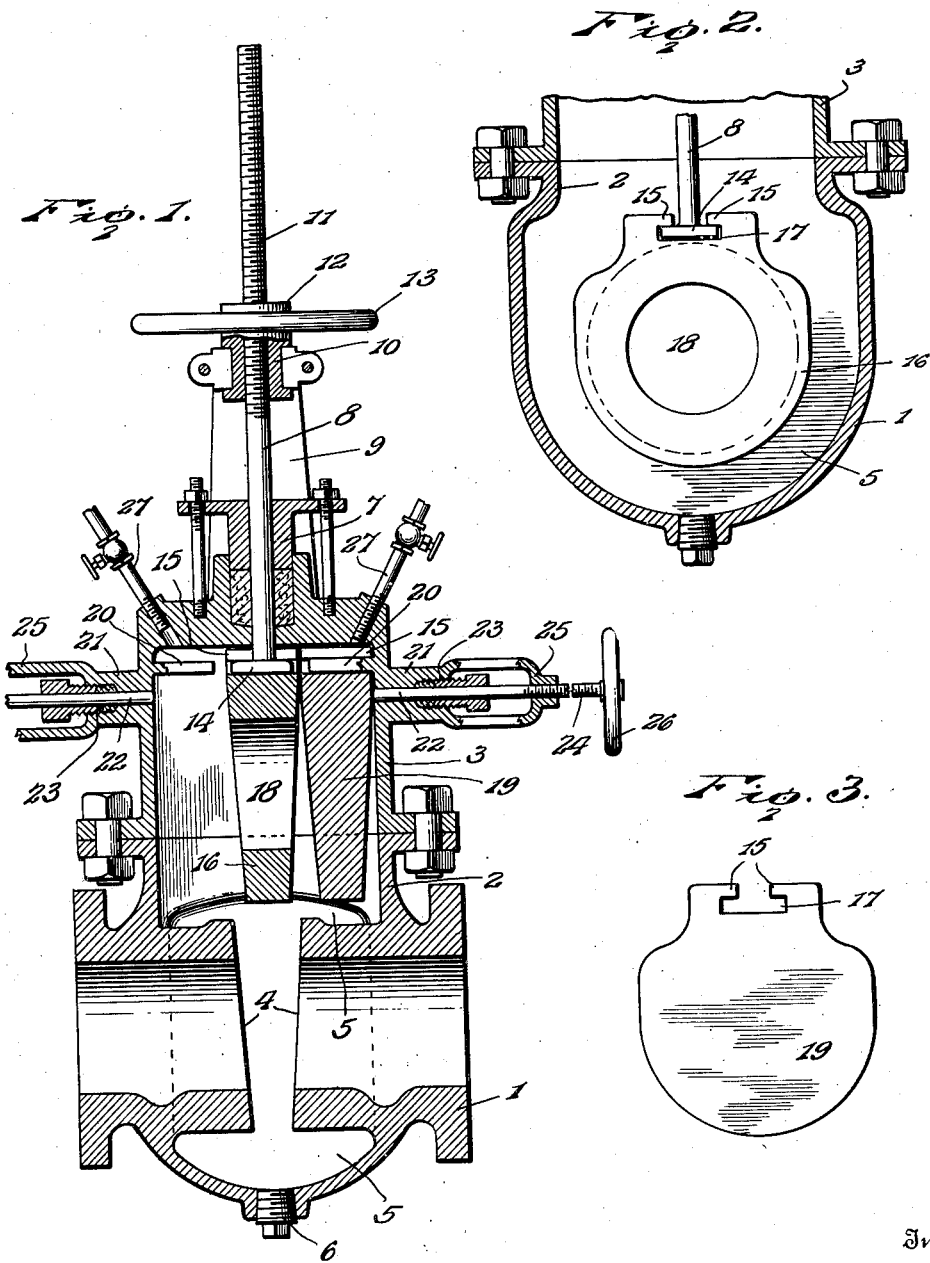
Inventor
Adam J. Eulberg.
By Lacey & Lacey, Attorneys Patented Feb. 18, 1936

2,031,151

UNITED STATES PATENT OFFICE 2,031,151

VALVE

Adam J. Eulberg, Sunburst, Mont.

Application March 15, 1935, Serial No. 11,300

5 Claims. (Cl. 251—51)

This invention relates to valves, and has special reference to valves for shutting off the transfer line which runs from the still to the cracking chamber in gasoline distilling or cracking apparatus, although it is, of course, adapted for use in various other fields. The object of the invention is to provide a valve which may be easily operated and which may be easily kept clean of all coking deposits so that it will be fully operative at all times. The invention is illustrated in the accompanying drawing and will be hereinafter fully set forth and defined.

In the drawing:

Figure 1 is a vertical section through a valve mechanism embodying the present invention, showing both valve bodies raised.

Figure 2 is a transverse section.

Figure 3 is a detail.

In carrying out the present invention, there is provided a valve casing 1 having a rim 2 on its upper side which constitutes the lower member of a bonnet, the upper member of said bonnet being provided by a cap 3 which is bolted onto the rim, as clearly shown. The valve casing has a bore extending from end to end thereof and is adapted to be coupled into the transmission line in any convenient manner. Midway between the ends of the valve casing, it is formed with downwardly converging opposed surfaces 4 which constitute a valve seat, and around the valve seat is a clean-out chamber 5 which communicates with the interior of the bonnet and has a drain opening in its bottom which may be closed by a drain cock or a plug 6. Upon the cap 3 is a packing box 7 through which a valve stem 8 passes, and rising from the cap is a standard or frame 9 supporting a bearing 10 through which the valve stem passes, as shown. The upper end portion of the valve stem is threaded, as shown at 11, and a nut 12, constituting the hub of a hand wheel 13, is engaged with said threaded portion and rests upon the bearing 10, as will be understood.

At its lower end, the valve stem is formed with a head 14 which is adapted to engage between and under the lugs 15 which are formed on the upper end of the orifice plate 16 at opposite sides of a channel 17 formed through said edge, the orifice plate being thus suspended on the stem and firmly carried thereby. Two plates are provided, the plate 16 having a central opening 18 therethrough adapted to register with the bore of the valve casing when this plate is seated and firmly wedged between the seats 4, thus permitting oil or other liquid to flow through the casing without entering the bonnet or the chamber 5. The other plate 19 which functions as a valve body is imperforate and adapted to close the bore of the casing when it is wedged between the seats and cut off flow through the bore and also prevent oil from entering the bonnet. Both plates are tapered downwardly, as shown clearly in Figure 1, to seat snugly and firmly in the space between the opposed converging surfaces 4. On the opposite walls of the cap 3, near the top thereof, projections or supporting arms 20 are provided adapted to enter the channels 17 of the plates 16 and 19 under certain conditions and thereby support that plate which is not in use. Formed on the outer sides of the cap 3, at or below the plane of the projections 20, are bearings 21 through which pass pusher rods 22, packing boxes 23 being provided to prevent leakage around said rods and the outer ends of the rods being threaded, as shown at 24, to engage through threaded yokes 25 extending from the bearings 21, hand wheels 26 being secured upon the outer ends of the respective pusher rods, as will be understood. In Figure 1, the valve is shown as entirely open, both plates being housed within the bonnet and the imperforate plate or valve body being suspended upon the proper projection 20, while the orifice plate is suspended on the lower end of the valve stem 8. If the hand wheel 13 be rotated so as to effect lowering of the orifice plate 16, said plate will enter between the opposed faces 4 of the valve casing and seat thereon. Oil can then flow through the bore of the casing but will be shut off from the bonnet and the chamber 5. If it be desired to cut off all flow through the valve casing and the pipe, the hand wheel 26 at the right of the figure is rotated so that the pusher rod 22 will be moved inwardly through the side of the bonnet and will thereby push the two plates to the left, the orifice plate 16 riding onto the projection 20 presented thereto and the valve body 19 riding onto the head 14 at the lower end of the valve stem and displacing the orifice plate. The valve stem may then be lowered through manipulation of the wheel 13 so that the valve body will be seated and block the bore of the casing as well as shutting off oil from the bonnet and the chamber 5. With either plate in place across the bore of the casing, the plug 6 can then be removed so that oil which has been trapped in the bonnet and chamber 5 can drain out and steam admitted through one or both of the pipes 27 will thoroughly cleanse the exposed surfaces of the plates and walls of the bonnet and chamber 5 of oil and coke deposits which may have formed thereon and carry it out through the drain opening.

From the foregoing description, taken in connection with the accompanying drawing, it will be seen that I have provided a very simple structure which may be easily operated and by which a plate is furnished to rest firmly in its seat without oil leaking into the bonnet or chamber 5 and the flow through the pipe and the valve casing may be established or cut off at will. Steam may be admitted to the bonnet whenever deemed necessary or desirable and will pass around the valve seat and play upon the inner surface of the bonnet so as to thoroughly clean the same and remove all coke or other deposits, passing out through the drain opening.

A valve so constructed may have its mechanical parts cleaned while the valve is in the transmission line, either while the oil is flowing through the pipe line and valve or with the valve blocked to prevent flow of oil through the pipe line regardless of the heat and pressure on the oil. The only time the bonnet is subjected to heat and pressure is the short interval during which one plate is being removed from the seat and the other set in place, as the oil which fills the bonnet and the chamber 5 will be drained out and steam admitted to cleanse the surfaces which have become coated immediately after a plate has been wedged between the converging surfaces 4 of the valve seat.

Having thus described the invention, what is claimed as new is:

1. A valve mechanism comprising a valve casing having internal opposed surfaces constituting a valve seat, a bonnet on the upper side of the valve casing open to the valve seat, a valve body, means within the bonnet for suspending the valve body in a raised position out of engagement with the seat, a valve stem mounted through the upper end of the bonnet and having its lower end adapted to be detachably engaged with the valve body, said stem being shiftable longitudinally to raise the valve body from the seat in the valve casing or lower the valve body onto the seat, and means to shift the valve body between the suspending means and inner end of the stem when the valve is in a raised position.

2. In a valve mechanism, a valve casing having a valve seat therein, a bonnet on the upper side of the valve casing, suspending means within the bonnet, an orifice plate and a valve plate engageable with said suspending means, a valve stem constructed to support one plate, and means mounted on the bonnet for shifting a plate from the suspending means onto the valve stem.

3. In valve mechanism, a valve casing, a bonnet on the valve casing, suspending means within the bonnet, a valve stem mounted in the top of the bonnet, an orifice plate and a valve plate constructed to be suspended on said suspending means or on the lower end of the valve stem, and means mounted on the sides of the bonnet for shifting a plate from the suspending means onto the valve stem and thereby shifting another plate from the valve stem onto the suspending means.

4. In a valve mechanism, a valve casing, a bonnet on said casing, a valve stem rising through the top of the bonnet, projections on the inner walls of the bonnet near the upper ends thereof at opposite sides of the valve stem, an orifice plate and a valve plate each constructed to engage one of said projections, pusher rods mounted through sides of the bonnet, and means for manipulating said pusher rods whereby a plate suspended on a projection may be moved from said projection onto the valve stem and will remove from the valve stem the plate suspended thereon and cause said plate to ride onto the opposed projection in the bonnet.

5. In a valve mechanism, a valve casing, a valve seat therein, a bonnet on the casing, valve-suspending means in the bonnet, a stem for shifting a valve into and out of engagement with the valve seat, and means for shifting the valve between the stem and said suspending means.

ADAM J. EULBERG.